United States Patent
Gierling et al.

(10) Patent No.: US 6,456,917 B1
(45) Date of Patent: Sep. 24, 2002

(54) METHOD FOR REDUCING THE THERMAL LOAD ON AN AUTOMATIC TRANSMISSION OF A MOTOR VEHICLE IN EMERGENCY OPERATING MODE

(75) Inventors: Armin Gierling, Langenargen (DE); Wolf-Dieter Schmid, Batavia, OH (US); Johannes Fischer, Friedrichshafen (DE)

(73) Assignee: ZF Batavia L.L.C., Batavia, OH (US)

( * ) Notice: Subject to any disclaimer, the term of this patent is extended or adjusted under 35 U.S.C. 154(b) by 0 days.

(21) Appl. No.: 09/787,557
(22) PCT Filed: Sep. 23, 1999
(86) PCT No.: PCT/EP99/07074
§ 371 (c)(1),
(2), (4) Date: Mar. 19, 2001
(87) PCT Pub. No.: WO00/19131
PCT Pub. Date: Apr. 6, 2000

(30) Foreign Application Priority Data

Sep. 29, 1998 (DE) .......................... 198 44 623

(51) Int. Cl.$^7$ .................................. G06F 7/00
(52) U.S. Cl. ............................ 701/51; 477/34
(58) Field of Search ................... 701/51, 61, 62; 477/34; 475/198, 207; 180/337

(56) References Cited

U.S. PATENT DOCUMENTS

| 5,216,938 A | 6/1993 | Yamaguchi | 74/866 |
| 5,588,515 A | * 12/1996 | Toyama et al. | 192/4 |
| 5,948,037 A | 9/1999 | Miraki | 701/114 |
| 5,961,408 A | 10/1999 | König et al. | 474/18 |

FOREIGN PATENT DOCUMENTS

| DE | 41 10 105 A1 | 10/1991 |
| DE | 44 36 506 A1 | 4/1996 |
| DE | 198 07 057 A1 | 8/1998 |
| WO | 93/13340 | 7/1993 |

OTHER PUBLICATIONS

Boos, Manfred and Wolf–Ekkehard Krieg. "Stufenloses Automatikgetriebe Ecotronic von ZF" *ATZ Automobiltechnische Zeitschrift* 96(1994) 6, pp. 378–384, no month.

Bock, Christian, Norbret Klauer and Jan Städter. "Das Antriebsmanagement des neuen BMW 750iA" *ATZ Automobiltechnische Zeitschrift* 97 (1995) 4, pp. 220–228, no month.

* cited by examiner

*Primary Examiner*—Yonel Beaulieu
(74) *Attorney, Agent, or Firm*—Davis & Bujold, P.L.L.C.

(57) ABSTRACT

The invention relates to an automatic transmission of a motor vehicle which is controlled by an electronic transmission control system which continuously exchanges signals with a digital engine electronics system of an internal combustion engine. To reduce the thermal load on the automatic transmission in emergency operating mode, a transmission-independent program module (M1) of the digital engine electronics system sets an admissible maximum vehicle speed for the emergency operating mode (v_max_not) or an admissible maximum engine speed for the emergency operating mode (n_mot_max_not).

13 Claims, 1 Drawing Sheet

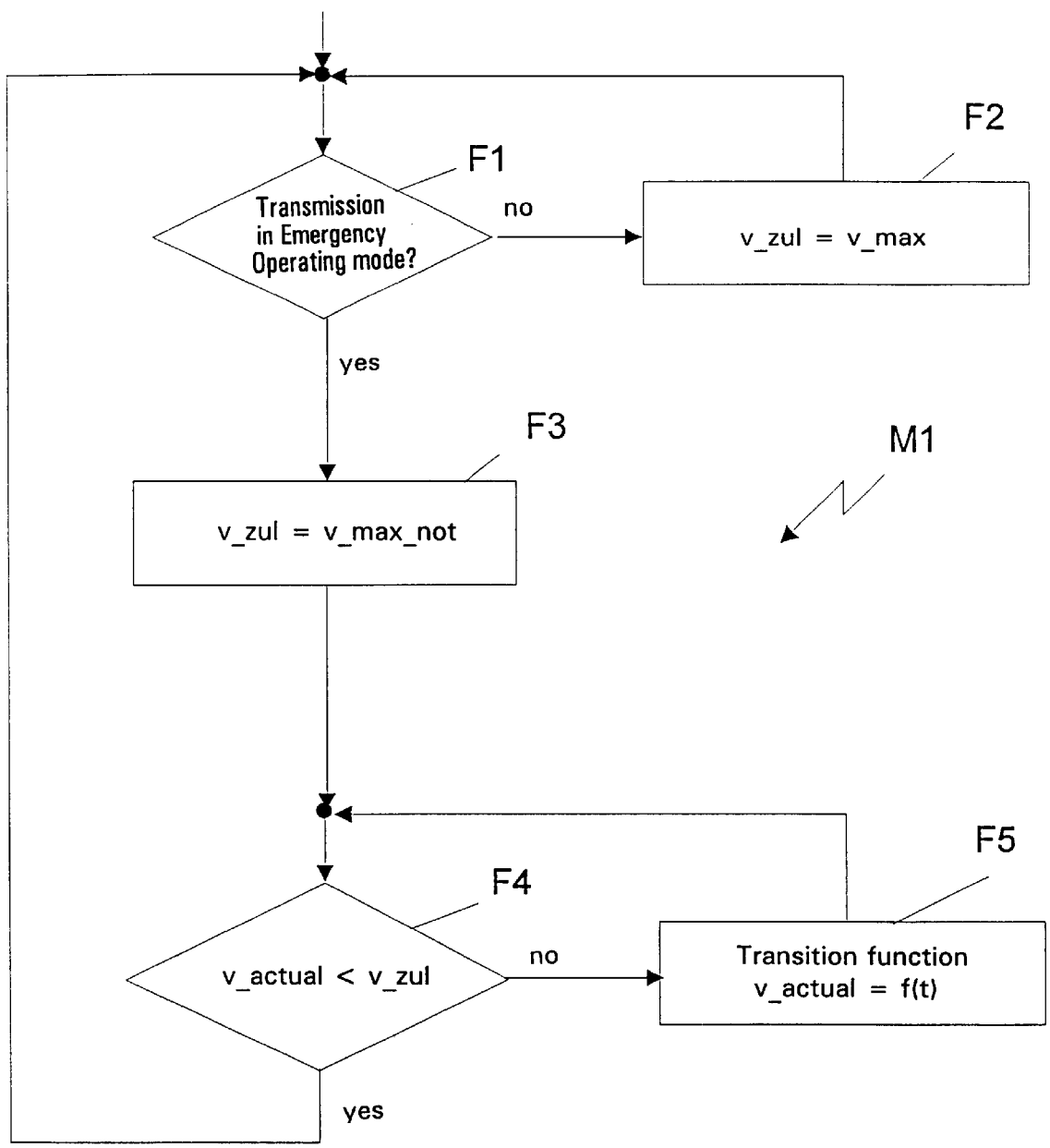

METHOD FOR REDUCING THE THERMAL LOAD ON AN AUTOMATIC TRANSMISSION OF A MOTOR VEHICLE IN EMERGENCY OPERATING MODE

FIELD OF THE INVENTION

The invention relates to a method for reducing the thermal load of an automatic transmission for a motor vehicle in an emergency operating mode.

BACKGROUND OF THE INVENTION

The utilization of the intelligence in electronics finds its expression in motor vehicles having modern automatic transmissions in the use of an electronic transmission control (EGS), which to a great extent, meets the known criteria to be relevant for the customers, such as driving comfort and drivability, and also relevant to security. For the selection of gear, according to situations, the electronic transmission control steadily communicates with other control units and computers of different aggregates via a CAN (controller area network) data bus.

For the case of a defect of the electronic transmission control, emergency operating programs have often been provided which are designed so that in an emergency operating mode a vehicle can be operated in the widest possible driving range. Depending on the emergency running, the cooling of the transmission is problematic in such an emergency operating mode, since the heat accumulation in the emergency operating mode of the transmission must be eliminated via the cooling system of the vehicle and, in case of complete failure of the electronic transmission control, the transmission has no positive way of its own to act upon the thermal load.

This particularly occurs in CVT (Continuously Variable Transmission) automatic transmissions which have a variator for continuous adjustment of a reduction ratio between a shortest possible ratio (LOW) and a longest possible ratio (overdrive, OD).

Such a CVT transmission with a first cone pulley pair upon an input shaft as primary pulley set and with a second cone pulley pair upon an output shaft as secondary pulley set has been described in "ATZ Automobiltechnische Zeitschrift" 96 (1994). Each cone pulley pair consists of a first pulley axially stationary and a second pulley axially movable which are designated as a primary pulley and a secondary pulley whereby they belong to the primary or secondary pulley sets, respectively. Between the cone pulley pairs rotates a torque-transmitting element, for example, a linked band, wound around the cone pulley pairs. To adjust the primary pulley and the secondary pulley, they are loaded with a pressure medium from a pressure source, the pressure being applied, respectively, to the adjusting chambers of the primary pulley and secondary pulley with the aid of an electronic transmission control and an electrohydraulic pressure-supply device.

DE 44 36 506 has disclosed a device for control of a CVT transmission in which an electronic control unit determines, via electromagnetic actuators and hydraulic valves, the pressure level of the adjusting chambers of primary pulley and secondary pulley which are not dynamically balanced.

For a failure of the electronic control unit, an emergency operating device is provided which has two pressure-regulating valves, two pressure-reducing valves and at least one emergency valve, wherein a primary valve and a secondary valve adjust a constant static pressure ratio or power ratio between primary pulley and secondary pulley in constant static secondary pressure level.

By the amount that the static power ratio and the dynamic forces on the pulleys is not dynamically pressure balanced, the magnitude of the ratio change of the CVT transmission from a normal operation to the emergency operating mode can be established. The emergency operating mode is at the same time described as a state of the CVT transmission in which a rotational speed regulation and a contact regulation of the secondary pulley are interrupted.

In this known device, the ratio of the CVT transmission varies according to the generated torque of an internal combustion engine provided as input unit, wherein the variable ratio change in the emergency operating mode makes a reliable start on the hill and improved driveability at high top speed possible.

As input signals abut on an electronic control unit, e.g. the signal of a load position of the input unit like the throttle valve position in case of an internal combustion engine, the rotational speed of the transmission input shaft, the rotational speed of the output shaft, or the temperature of the pressure medium. From the input signal, an operating point is determined and the appertaining rotational speed of the transmission input shaft or the ratio of the CVT transmission adjusted. When an error occurs, the CVT transmission changes over to the emergency operating mode in which no rotational speed regulation and no contact pressure regulation of the secondary pulley take place any more.

Even though this known solution offers a wide possible adjustment range of the variator, it is problematic that the contact pressure for the corresponding pulleys must be designed according to the extreme points of the driveability range. One of the points is the guaranty of the maximum starting power in the lowest gear, i.e. in or near the LOW ratio. For the variator capacity of transmission, a higher contact pressure on the secondary pulley is required at high ratio and high input torque. As result of the constant static pressure ratio between primary pulley and secondary pulley, the static force adjusted on the secondary pulley, whose magnitude depends on the maximum input torque to be transmitted, is constant in the whole torque range.

In wide driving ranges, the consequence of this is an undesired overpressure, which disadvantageously leads to a high operating temperature in the variator with increased loss of effectiveness and wear of the variator system.

To reduce an inadmissible thermal load of the input engine of a vehicle, in WO 93/13340 has been disclosed a diagnosis module designed as self-sufficient control module detects erroneous conditions of the drive train via defined limiting value observations of sensor signals or input signals delivered by other control units of the drive train. Depending on faulty gravity, the diagnosis module more or less limits the maximum admissible vehicle speed. Combined with a transmission control, WO 93/13340 proposes to limit the vehicle speed by the gear selection of the transmission, the relevant gear of the transmission control being preset by the diagnosis module according to the maximum admissible vehicle speed, which presupposes a fully operable transmission control.

SUMMARY OF THE INVENTION

The problem on which this invention is based is to make a method available for reducing the thermal load of an automatic transmission for a motor vehicle in an emergency operating mode in which method the thermal and mechanical damages on the automatic transmission are prevented due to heat action during the emergency operating mode.

With the aid of the inventive method, a maximum vehicle speed v_max_not or maximum engine rotational speed n_mot_max_not is preset by the digital motor electronic system in the emergency operating mode, it is possible to prevent, by a simple limitation of the operating range, a thermal overstress and a heat-determined wear of components of the automatic transmission, the same as a thermal aging of the transmission oil.

In the inventive method, the necessary protective functions for the transmission are perceived by the engine electronic system whereby a more effective overheat protection is still ensured when the electronic transmission control has entirely failed, has been electronically disconnected, or has been electrically separated from the vehicle circuit electronics.

The limitation of the vehicle speed or the limitation of the engine rotational speed, which likewise entails a limitation of the highest speed of the vehicle, by a program module in the engine electronics system represents a simple, but effective step, both in regard to an electrohydraulically controlled stepped automatic transmission of conventional type and also in regard to a CVT transmission.

The use of the inventive method is of special advantage in CVT transmissions, since with only a slight limitation of the operating condition is prevented here; the entrance of heat in the variator due to overcontact with the attendant consequences of wear.

In addition by omitting extreme angular points of the driveability in the emergency operating mode, the dimensions of the transmission oil cooler can be kept small.

BRIEF DESCRIPTION OF THE DRAWING(S)

Other advantages and developments of the invention form the embodiment fundamentally described herebelow with reference to the drawing.

The drawing shows a flow chart in basic characteristics of an inventive method for reducing the thermal load of an automatic transmission in emergency operating mode.

DETAILED DESCRIPTION OF THE INVENTION

To apply the method, in a digital engine electronics system of an internal combustion engine (not shown in detail) which exchanges signals via a CAN (controller area network) data bus with an electronic transmission control device, a program module M1 is provided which is independent of the transmission control.

In the program module M1 is first constantly tested in a first function F1 whether a CAN signal indicative of a normal operation of the electronic transmission control device enters in the digital engine electronics system. When this is the case, the digital engine electronics system issues in a subsequent function F2 as admissible vehicle speed v_zul a highest speed provided for the vehicle in the normal operation v_max.

If due to the failure of the CAN signal that dominates the normal operation, it is detected that the transmission is in emergency operating mode, in a function F3 the digital engine electronics system limits the admissible vehicle speed v_zul to a maximum vehicle speed for an emergency operating mode v_max_not such as 130 km/h.

In the emergency operating mode, it is tested in one other differentiation function F4 whether an actual vehicle speed v_actual is lower than or equal to the maximum vehicle speed for the emergency operating mode v_max_not. If this is the case, the beginning of the program module M1 is branched back to.

However, when the actual vehicle speed v-actual is higher than the preset admissible maximum vehicle speed for emergency operating mode v_max_not, a transition function F5, likewise implemented in the digital engine electronics system, is started which ensures a reliable transition from the actual vehicle speed v_actual to the admissible maximum vehicle speed for the emergency operating mode v_max_not.

The time-dependent transition function F5 reduces the actual vehicle speed v_actual ramp-like, that is slowly, until the admissible maximum vehicle speed for the emergency operating mode v_max_not is reached. Thereby an abrupt change of speed with accompanying losses in driving comfort and vehicle instabilities critical to safety is prevented.

In another embodiment (not shown) to the ramp-like transition function F5 can be connected in series a discrete time step during which the actual vehicle speed v_actual is accepted without engagement.

The actual vehicle speed v_actual is reduced during the course of the transition function F5 by a slow removal of a fuel injection amount of the internal combustion engine or by a slow removal of a throttle valve angle of the internal combustion engine operatively connected with an electronic accelerator pedal.

As input signal for rating or processing, the actual vehicle speed v_actual serve speed portional variables like a wheel rotational speed recorded via a sensor of an antiblocking system.

In the instant embodiment, the method for reducing the thermal load of the automatic transmission in emergency operating mode is applied to a CVT automatic transmission which has a variator with a primary pulley set, a secondary pulley set and a pushing linked band wound around them as torque-transmitting element. In the emergency operating mode, a contact pressure regulation of the secondary pulley set is interrupted and a constant static pressure ratio is adjusted between the primary pulley set and the secondary pulley set.

By limiting the admissible vehicle speed v_zul in the emergency operating mode of the transmission, the operating range of the vehicle is purposefully limited, the operating modes of the CVT automatic transmission being reduced with higher overpressing on the variator without clearly limiting the operating readiness of the vehicle.

Alternatively to the method shown in the drawing, it is obviously possible instead of the limitation of the admissible vehicle speed v_zul in the emergency operating mode of the transmission, to carry out a limitation of the admissible engine rotational speed, e.g. to a maximum rotational speed of 4000 rpm, the vehicle availability being, of course, further reduced. The method itself develops similarly to the method shown.

In a CVT automatic transmission with a starting clutch on the output side, as consequence of the direct coupling of the engine with the variator and the reduction ratio that appears according to the engine torque in the absence of positive engagement, the variator can be adjusted by gas supply according to an overdrive ratio. The secondary pulley of the variator must be protected against overspeed.

In addition as one other method step not shown, the actual engine rotational speed n_mot_actual is immediately limited to the admissible maximum engine rotational speed n_mot_max_not when the emergency operating mode of the automatic transmission is detected in a selector lever position not requiring positive engagement such as "P" and "N".

When the actual engine rotational speed n_mot_actual is of course higher than the admissible maximum engine rotational speed n_mot_max_not and the emergency operating mode of the automatic transmission is detected in a selector lever position requiring positive engagement, the actual engine rotational speed n_mot_actual is changed over in a ramp-like transition function to the admissible maximum engine rotational speed n_mot_max_not.

In another embodiment, the inventive method an also be provided in combination with a torque converter automatic transmission in which a lock-up clutch is opened in the emergency operating mode. The limitation of the vehicle speed or of the engine rotational speed advantageously reduces the possible great charge of heat in the automatic transmission resulting from the torque converter power loss.

Finally, to improve the cooling of the transmission, in other embodiments an engine ventilator is started which is operated at an adaptable coolant temperature lowered, e.g. by 20 K C_Luefter_ein_not. Alternatively to this, the engine ventilator obviously can also run permanently.

| Reference numerals | |
| --- | --- |
| F1 | differentiation function |
| F2 | processing function |
| F3 | processing function |
| F4 | differentiation function |
| F5 | transition function |
| M1 | program mode | v_actual actual vehicle speed
v_max admissible maximum vehicle speed in normal operation
v_max_not admissible maximum vehicle speed in emergency operating mode
v_zul admissible vehicle speed

What is claimed is:

1. A method for reducing the thermal load of an automatic transmission for a motor vehicle during operation in an emergency operating mode wherein the automatic transmission is controlled by an electronic transmission control device which exchanges signals with a digital engine electronics system of an internal combustion engine, and the electronic transmission control device being unable to function during the emergency operating mode, the method comprising the steps of:
   (1) detecting when the vehicle is operating in the emergency operating mode and when the vehicle is operating in a normal mode;
   (2) when the vehicle is operating in the normal mode, determining a highest speed of operation for the vehicle as an admissible speed of vehicle operation;
   (3) when the vehicle is operating during the emergency operating mode, determining a preset admissible vehicle emergency mode speed as a preset maximum vehicle speed for operating during the emergency mode;
   (4) determining if an actual vehicle speed of the vehicle is higher than the preset maximum vehicle speed for operating in the emergency operating mode; and
   (5) when the actual vehicle speed is determined as being higher than the preset maximum vehicle speed for operating in the emergency operating mode, reducing the actual vehicle speed to the preset maximum vehicle speed.

2. The method according to claim 1, further comprising the step of, during operating in the emergency operating mode, presetting, via a transmission-independent program module (M1) of the digital engine electronics system, one of an admissible maximum vehicle speed for the emergency operating mode (v_max_not) and an admissible maximum engine rotational speed for the emergency operating mode (n_mot_max_not) as the admissible maximum vehicle speed for the emergency operating mode.

3. The method according to claim 2, further comprising the step of presetting one of the admissible maximum vehicle speed for the emergency mode (v_max_not) and the admissible maximum engine rotational speed for the emergency operating mode (n_mot_max_not) when the digital engine electronics system detects the emergency operating mode of the automatic transmission resulting from a failure of a signal of the electronic transmission control device indicative of a normal operation.

4. The method according to claim 3, further comprising the step of entering a signal into the digital engine electronics system, indicative of the normal operation of the electronic transmission control device, as a CAN signal.

5. The method according to claim 2, further comprising the step of, when one of the actual vehicle speed (v_actual) is higher than one of the admissible maximum vehicle speed for the emergency operating mode (v_max_not) and the actual engine rotational speed (n_mot_actual) is higher than the admissible maximum engine rotational speed for the emergency operating mode (n_mot_max_not), starting a transition function (F5) to convert an actual vehicle speed (v_actual) to one of the admissible maximum vehicle speed for the emergency operating mode (v_max_not) and an actual engine rotational speed (n_mot_actual) to the admissible maximum engine rotational speed for the emergency operating mode (n_mot_max_not).

6. The method according to claim 5, further comprising the step of converting the actual vehicle speed (v_actual) to the preset maximum vehicle speed for operating in the emergency operating mode (v_max_not) by one of a modifying of a fuel injection amount for the internal combustion engine and a modifying of a throttle valve angle for the internal combustion engine operatively connected with an electronic accelerator pedal.

7. The method according to claim 5, further comprising the step of converting, via the transition function (F5), one of the actual vehicle speed (v_actual) and the actual engine rotational speed (n_mot_actual) in a ramp-like manner to one of the admissible maximum vehicle speed for the emergency operating mode (v_max_not) and the admissible maximum engine rotational speed for the emergency operating mode (n_mot_max_not).

8. The method according to claim 5, further comprising the step of accepting, without engagement, one of the actual vehicle speed (v_actual) and the actual engine rotational speed (n_mot_aktuell) by a series of discrete time steps of the transition function (F5).

9. The method according to claim 2, further comprising the step of controlling, via the electronic transmission control device, a variator of the automatic transmission which has a primary pulley set and a secondary pulley set with a torque-transmitter element wrapped up around the primary and secondary pulley sets and, during operation in the emergency operating mode, interrupting a contact pressure regulation of the secondary pulley set and adjusting a constant static pressure ratio between the primary pulley set and the secondary pulley set.

10. The method according to claim 2, wherein the automatic transmission has a starting clutch on the output side, and the method further comprising the step of immediately limiting the actual engine rotational speed (n_mot_actual) to the admissible maximum engine rotational speed (n_mot_max_not) when the emergency operating mode of the automatic transmission is detected in a selector lever position not requiring positive engagement.

11. The method according to claim 2, wherein the automatic transmission has a starting clutch on the output side, and the method further comprising the step of converting the actual engine rotational speed (n_mot_actual) in a ramp-like transition function to the admissible speed (n_mot_actual) when the actual engine rotational speed is higher than the admissible maximum engine rotational speed (n_mot_max_not) and the emergency operating mode of the automatic transmission is detected in a selector lever position requiring positive engagement.

12. The method according to claim 2, further comprising the step of, when the emergency operating mode of the automatic transmission is detected, operating an engine ventilator with an applicable lowered coolant temperature (C_Luefter_ein_not).

13. A method for reducing the thermal load of an automatic transmission for a motor vehicle during operation in an emergency operating mode wherein the automatic transmission is controlled by an electronic transmission control device which exchanges signals with a digital engine electronics system of an internal combustion engine, and the electronic transmission control device being unable to function during the emergency operating mode, the method comprising the steps of:

(1) detecting when the vehicle is operating in the emergency operating mode and when the vehicle is operating in a normal mode;

(2) when the vehicle is operating during the emergency operating mode, determining a preset admissible vehicle emergency mode speed as a preset maximum vehicle speed for operating during the emergency mode;

(3) determining if an actual vehicle speed of the vehicle is higher than the preset maximum vehicle speed for operating in the emergency operating mode; and (4) when the actual vehicle speed is determined as being higher than the preset maximum vehicle speed for operating in the emergency operating mode, reducing the actual vehicle speed to the preset maximum vehicle speed.

* * * * *